United States Patent [19]
Luethi

[11] 3,843,651
[45] Oct. 22, 1974

[54] PYREN-A-TRIAZINES
[75] Inventor: Christian Luethi, Muenchenstein, Switzerland
[73] Assignee: Ciba-Geigy A.G., Basel, Switzerland
[22] Filed: June 19, 1972
[21] Appl. No.: 264,122

[30] Foreign Application Priority Data
July 12, 1971 Switzerland.................. 10205/71

[52] U.S. Cl................. 260/248 CS, 252/301.2 W, 117/33.5 T, 8/1 W
[51] Int. Cl............................................. C07d 55/50
[58] Field of Search.............................. 260/248 CS

[56] References Cited
UNITED STATES PATENTS
3,268,474   8/1966   Hardy et al................. 260/248
FOREIGN PATENTS OR APPLICATIONS
985,484   11/1962   Great Britain................. 260/248

Primary Examiner—John M. Ford
Attorney, Agent, or Firm—Joseph G. Kolodny; Edward McC. Roberts; Prabodh I. Almaula

[57] ABSTRACT

The invention relates to pyrenyl-triazine compounds of the formula

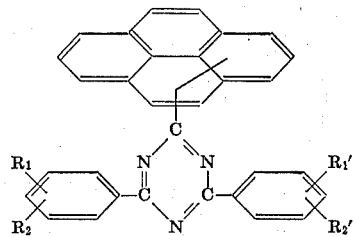

wherein $R_1$, $R_1'$, $R_2$ and $R_2'$ independently of one another denote hydrogen, alkyl or halogen. These compounds are useful as optical brighteners for high molecular organic material.

2 Claims, No Drawings

PYREN-A-TRIAZINES

The present application relates to new pyrenyl-triazine compounds, processes for their manufacture and their use for the optical brightening of organic materials, for example polyolefines, such as polyethylene and polypropylene, polystyrene, polyvinyl chloride, polyurethanes, acetylcellulose, polyacrylonitrile and especially polyesters, preferably in the spinning composition.

British Pat. specification 985,484 has disclosed pyrenyl-triazine compounds which contain chlorine, amino, alkoxy, aryloxy or alkylthio groups as further substituents on the triazine ring. However, these compounds do not meet present-day requirements as regards light fastness. Surprisingly, a class of pyrenyl-triazine compounds of particularly high light fastness has now been discovered.

These new compounds correspond to the formula (1)
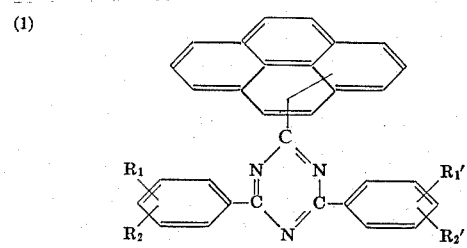

wherein $R_1$, $R_1'$, $R_2$ and $R_2'$ independently of one another denote hydrogen, alkyl or halogen. Alkyl preferably represents alkyl with 1 to 4 carbon atoms and halogen especially represents chlorine or bromine.

Within the framework of the formula (1), the compounds in which the substituents of the two phenyl radicals are symmetrically located relative to one another, that is to say with $R_1 = R_1'$ and $R_2 = R_2'$, should be singled out.

Compounds of particular practical interest correspond to the formula (2)
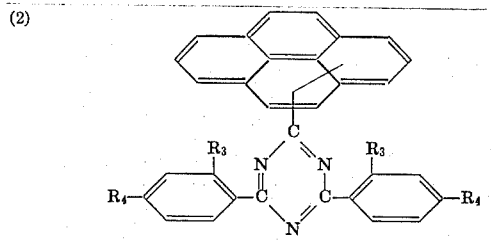

wherein $R_3$ and $R_4$ independently of one another denote hydrogen, alkyl with 1 to 4 carbon atoms, chlorine or bromine.

As examples of compounds of the above types, the following 2-pyrenyl-4,6-di-phenyl-1,3,5-triazines may be listed:

(3)
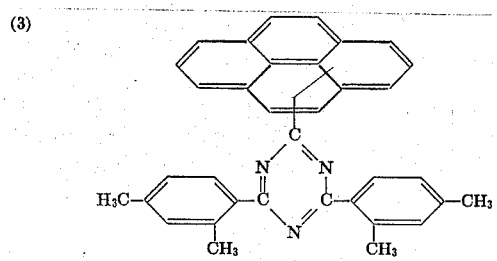

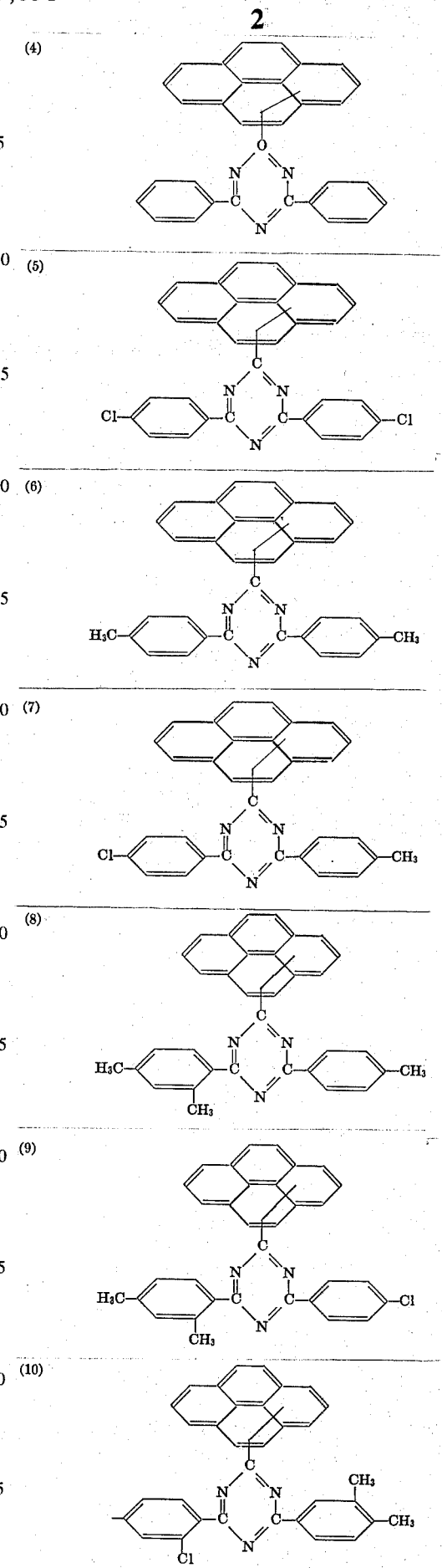

(11)
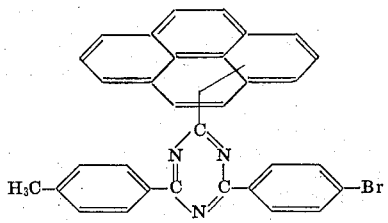

(12)
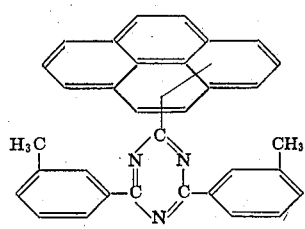

The point at which the pyrene radical

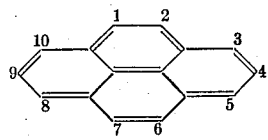

is linked to the triazine radical cannot be determined unambiguously, especially when manufacturing the compounds according to the invention in accordance with the preferred process described below. Linkage via the 3-position (or via the 5-, 8- or 10-position, which is equivalent thereto) appears most probable.

The compounds of the formula (1) can be manufactured analogously to known processes. An appropriate process is to react cyanuric chloride in the presence of Friedel-Crafts catalysts, in optional sequence with pyrene, with a compound of the formula

(13) 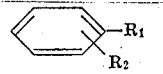

and with a compound of the formula

(14) 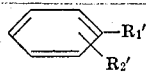

wherein $R_1$, $R_1'$, $R_2$ and $R_2'$ have the abovementioned meaning, in the melt or in a solvent which is inert towards the reactants or, if appropriate, simultaneously acts as a reactant, at temperatures of 80° to 220°C. Advantageously, the procedure followed is either that in the first stage the pyrene radical is introduced and then the two radicals of the compounds of the formulae (13) and (14) are introduced, or that first the two radicals of the compounds of the formulae (13) and (14) are introduced and then the pyrene radical is introduced, the intermediate product being isolated if appropriate.

Thus, for example, a product of the formula

(15)
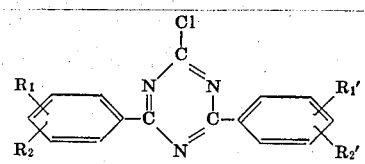

wherein $R_1$, $R_1'$, $R_2$ and $R_2'$ have the abovementioned meaning, obtained in the first stage as described above or obtained according to another known process, is reacted in the presence of an approximately equimolar amount of anhydrous aluminium chloride, preferably in a solvent which is inert towards the reactants, such as dichlorobenzene, with an approximately equimolar amount of pyrene at temperatures of 140° to 200°C, preferably 150° to 180°C, the reaction time being about 10 to 20 hours. After the end of the reaction, the aluminum complex produced is decomposed in accordance with known methods, for example by treatment with water, and the compound of aluminium formula (1) is isolated.

It is furthermore also possible to react 2-pyrenyl-4,6-dichloro-1,3,5-triazine, obtained according to the above process or another known process, in the presence of an equimolar amount of a Friedel-Crafts catalyst, for example anhydrous aluminium chloride, with equimolar amounts of each of a compound of the formula (13) and a compound of the formula (14), in a solvent which is inert towards the reactants. If the two compounds of the formulae (13) and (14) are identical, an excess of this compound is preferably used, which thereby simultaneously assumes the role of the solvent. In general, the reaction is allowed to take place at temperatures of 80° to 140°C.

Another process for the manufacture of the compounds of the formula (1) consists of reacting pyrenecarboxylic acid chloride with an equimolar amount of each of a compound of the formulae

(16) 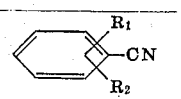

and

(17) 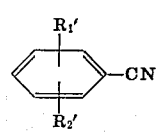

wherein $R_1$, $R_1'$, $R_2$ and $R_2'$ have the abovementioned meaning, in the presence of one equivalent of a Friedel-Crafts catalyst, such as thereto: aluminium chloride, at temperatures of 60° to 200°C, the reaction being carried out in a solvent which is inert towards the reactants, such as dichlorobenzene. If the compounds of the formulae (16) and (17) are identical, the reaction can also be carried out in an excess of such a compound, which thereby simultaneously is the solvent. The aluminate complex formed is converted, either directly or after isolation, into the desired 1,3,5-triazine compound by means of an excess of ammonium chloride at 80° to 180°C.

The new compounds defined above possess a more or less pronounced fluorescence in the dissolved or finely divided state. They can be used for the optical brightening of the most diverse synthetic, semi-synthetic or natural organic materials or substances which contain such organic materials.

The following groups of organic materials, where optical brightening thereof is relevant, may be mentioned as examples of the above, without the survey given below being intended to express any restriction therto:

I. Synthetic organic high molecular materials:

a. Polymerisation products based on organic compounds containing at least one polymerisable carbon-carbon double bond, that is to say their homopolymers or copolymers as well as their after-treatment products such as, for example, crosslinking, grafting or degradation products, polymer blends, or products obtained by modification of reactive groups, for example polymers based on α, β-unsaturated carobxylic acids or derivatives of such carboxylic acids, especially on acrylic compounds (such as, for example, acrylic esters, acrylic acid, acrylonitrile, acrylamides and their derivatives or their methacryl analogues) and on olefine hydrocarbons (such as, for example, ethylene, propylene, styrenes or dienes, and also so-called ABS-polymers), and polymers based on vinyl and vinylidene compounds (such as, for example, vinyl chloride, vinyl alcohol and vinylidene chloride), b. Polymerisation products which are obtainable by ring opening, for example, polyamides of the polycaprolactam type, and also polymers which are obtainable both via polyaddition and via polycondensation, such as polyethers or polyacetals, c. Polycondensation products or precondensates based on bifunctional or polyfunctional compounds possessing condensable groups, their homocondensation and co-condensation products, and after-treatment products, such as, for example, polyesters, especially saturated (for example ethylene glycol/terephthalic acid polyesters) or unsaturated (for example maleic acid/dialcohol polycondensates and their crosslinking products with copolymerisable vinyl monomers), unbranched as well as branched polyesters (also those based on polyhydric alcohols, such as, for example, alkyd resins), polyamides (for example hexamethylenediamine adipate), maleate resins, melamine resins, their precondensates and analogues, polycarbonates and silicones.

d. Polyaddition products such as polyurethanes (crosslinked and non-crosslinked) and epoxide resins.

II. Semi-synthetic organic materials such as, for example, cellulose esters of varying degrees of esterification (so-called 2½-acetate or triacetate) or cellulose ethers, regenerated cellulose (viscose or cuprammonium cellulose), or their after-treatment products, and casein plastics.

III. Natural organic materials of animal or vegetable origin, for example based on cellulose or proteins, such as cotton, wool, linen, silk, natural lacquer resins, starch and casein.

The organic materials to be optically brightened can be in the most diverse states of processing (raw materials, semi-finished goods or finished goods). On the other hand, they can be in the form of structures of the most diverse shapes, that is to say for example predominantly three-dimensional bodies such as sheets, profiles, injection mouldings, various machined articles, chips, granules or foams, and also as predominantly two-dimensional bodies such as films, foils, lacquers, coatings, impregnations and coatings, or as predominately one-dimensional bodies such as filaments, fibres, flocks and wires. The said materials can, on the other hand, also be in an unshaped state, in the most diverse homogeneous or inhomogeneous forms of division, such as, for example, in the form of powders, solutions, emulsions, dispersions, latices, pastes or waxes and the like.

Fibre materials can, for example, be in the form of endless filaments (stretched or unstretched), staple fibres, flocks, hands, textile filaments, yarns, threads, fibre fleeces, felts, waddings, flock structures or woven textile fabrics, textile laminates, knitted fabrics and papers, cardboards or paper compositions.

The compounds to be used according to the invention are of importance, inter alia, for the treatment of organic textile materials, especially woven textile fabrics. Where fibres, which can be in the form of staple fibres or endless filaments or in the form of hanks, woven fabrics, knitted fabrics, fleeces, flock substrates or laminates, are to be optically brightened according to the invention, this is advantageously effected in an aqueous medium, wherein the compounds in question are present in a finely divided form, suspensions, so-called micro-dispersions or possibly solutions). If desired, dispersing agents, stabilisers, wetting agents and further auxiliaries can be added during the treatment.

Depending on the type of brightener compound used, it may prove advantageous to carry out the treatment in a neutral or alkaline or acid bath. The treatment is usually carried out at temperatures of about 20° to 140°C, for example at the boiling point of the bath or near it (about 90°C). Solutions or emulsions in organic solvents can also be used for the finishing, according to the invention, of textile substrates, as is practised in the dyeing trade in so-called solvent dyeing (pad-thermofix application, or exhaustion dyeing processes in dyeing machines).

The new optical brighteners according to the present invention can further be added to, or incorporated in, the materials before or during their shaping. Thus they can for example be added to the compression moulding composition of injection moulding composition during the manufacture of films, sheets (for example milling into hot polyvinyl chloride) or mouldings.

Where fully synthetic or semi-synthetic organic materials are being shaped by spinning processes or via spinning compositions, the optical brighteners can be applied in accordance with the following processes:

Addition to the starting substances (for example monomers) or intermediates (for example precondensates or prepolymers), that is to say before or during the polymerisation, polycondensation or polyaddition, Powdering onto polymer chips or granules for spinning compositions, Bath dyeing of polymer chips or granules for spinning compositions, Metered addition to spinning melts or spinning solutions, and Application to the tow before stretching.

The new optical brighteners according to the present invention can, for example, also be employed in the following use forms:

a. Mixed with dyestuffs (shading) or pigments (coloured pigments or especially, for example white pigments) or as an additive to dye baths, printing pastes, discharge pastes or reserve pastes, or for the aftertreatment of dyeings, prints or discharge prints.

b. Mixed with so-called "carriers," wetting agents, plasticisers, swelling agents, anti-oxidants, light protection agents, heat stabilisers and chemical bleaching agents (chlorite bleach and bleaching bath additives).

c. Mixed with crosslinking agents or finishes (for example starch or synthetic finishes), and in combination with the most diverse textile finishing processes, especially synthetic resin finishes (for example creaseproof finishes such as "wash-and-wear," "permanent-press"

or "no-iron"), as well as flameproof finishes, soft handle finishes, "anti-soiling" finishes or antistatic finishes, or antimicrobial finishes.

d. Incorporation of the optical brighteners into polymeric carriers (polymerisation, polycondensation or polyaddition products), in a dissolved or dispersed form, for use, for example, in coating compositions, impregnating compositions or binders (solutions, dispersions and emulsions) for textiles, fleeces, paper and leather.

e. As additives to so-called "master batches."

f. As additives to the most diverse industrial products in order to render these more marketable (for example improving the appearance of soaps, detergents and pigments.

g. In combination with other optically brightening substances.

h. In spinning bath preparations, that is to say as additives to spinning baths such as are used for improving the slip for the further processing of synthetic fibres, or from a special bath before the esterification of the fibre.

i. As scintillators for various purposes of a photographic nature, such as, for example, for electrophotographic reproduction or supersentitisation.

If the brightening process is combined with textile treatment methods or finishing methods, the combined treatment can in many cases advantageously be carried out with the aid of appropriate stable preparations, which contain the optically brightening compounds in such concentration that the desired brightening effect is achieved.

In certain cases, the brighteners are made fully effective by an after-treatment. This can, for example, represent a chemical treatment (for example acid treatment), a thermal treatment (for example heat) or a combined chemical/thermal treatment. Thus, for example, the appropriate procedure to follow in optically brightening a series of fibre substrates, for example polyester fibres, with the brighteners according to the invention is to impregnate these fibres with the aqueous dispersions (optionally also solutions) of the brighteners at temperatures below 75°C, for example at room temperature, and to subject them to a dry heat treatment at temperatures above 100°C, it being generally advisable additionally to dry the fibre material beforehand at a moderately elevated temperature, for example at not less than 60°C and up to about 130°C. The heat treatment in the dry state is then advantageously carried out at temperatures between 120° and 225°C, for example by heating in a drying chamber, by ironing within the specified temperature range or by treatment with dry, superheated steam. The drying and dry heat treatment can also be carried out in immediate succession or be combined in a single process stage.

The amount of the new optical brighteners to be used according to the invention, relative to the material to be optically brightened, can vary within wide limits. A distinct and durable effect is already achievable with very small amounts, in certain cases, for example, amounts of 0.0001 percent by weight. However, amounts of up to about 0.8 percent by weight and optionally up to about 2 percent by weight can also be employed. For most practical purposes, amounts between 0.0005 and 0.5 percent by weight are of preferred interest.

In the examples, the parts, unless otherwise stated, are always parts by weight and the percentages are always percentages by weight. Unless otherwise stated, melting points and boiling points are uncorrected.

EXAMPLE 1

20 g of 2-chloro-4,6-bis-(2,4-dimethylphenyl)-1,3,5-triazine and 14.2 g of pyrene together with 10.8 g of anhydrous aluminium chloride in 200 ml of dichlorobenzene are heated to 160°C. The reaction mixture is allowed to react, whilst stirring, for 3 hours at 160°C and for 10 hours at 170° to 175°C and is then poured out onto an ice-water mixture, and the dichlorobenzene is removed by steam distillation.

The 31 g of crude product are dissolved in chloroform and purified chromatographically on an Alox column ($\phi = 5$ cm, length = 35 cm). 18.3 g of the compound of the formula (3)

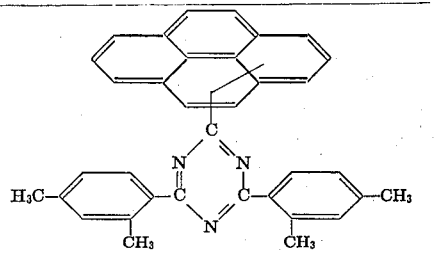

are thus obtained as a crystalline powder of melting point 167° to 170°C, having a yellow-green fluorescence.

The following compounds were manufactured analogously:

(4)

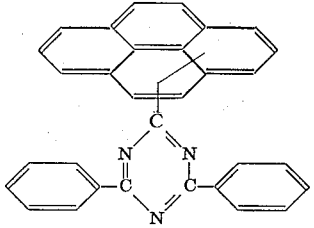

Melting point: 220° to 221°C (from 2-chloro-4,6-bis-phenyl-1,3,5-triazine and pyrene), purified by recrystallisation from nonane/fuller's earth and ethyl acetate-/active charcoal-alcohol.

(5)

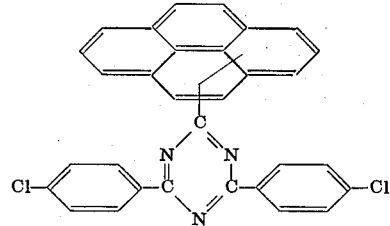

Melting point: 239° to 242°C (from 2-chloro-4,6-bis-[4-chlorophenyl]-1,3,5-triazine and pyrene), purified by three recrystallisations from xylene/fuller's earth. The compound re-solidifies after melting and shows a second melting point at 265° to 266°C.

EXAMPLE 2

7 g of 2-pyrenyl-4,6-dichloro-1,3,5-triazine in 50 ml of toluene are heated with 5.4 g of anhydrous aluminium chloride for 3 hours at 100°C and subsequently for 20 hours under reflux. The cooled reaction mixture is decomposed by pouring out onto an ice-water mixture, and the excess toluene is removed by passing in steam. After recrystallisation of the crude product from nonane/fuller's earth, acetone-water and dioxane/active charcoal-water, the product of the formula (6)
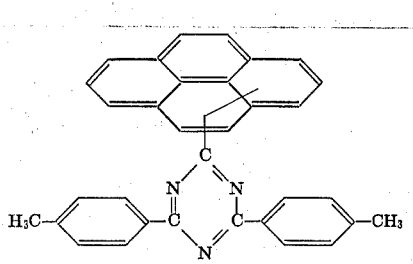

melting at 226° to 227°C is obtained.

EXAMPLE 3

100 parts of polyester granules (terephthalic acid-/ethylene glycol condensate) are intimately mixed with 0.03 part of the compound of the formula (6) and fused at 280° to 290°C, whilst stirring. After the usual spinning of the spinning composition thus obtained, strongly brightened polyester fibres of excellent fastness to light are obtained.

The abovementioned compound can also be added before or during the polycondensation of the polyester.

Instead of the compound of the formula (6), one of the compounds of the formula (3) or (4) can also be used.

EXAMPLE 4

100 parts of polystyrene and 0.1 part of the compound of the formula (4) or (6) are fused, with exclusion of air, in a tube of 1 cm diameter for 20 minutes at 210°C. After cooling, an optically brightened polystyrene composition of good fastness to light is obtained.

EXAMPLE 5

100 parts of polyethylene are calendered on a calender heated to 130°C, to give a homogeneous sheet. 0.02 part of the compound of the formula (6) is slowly incorporated into this sheet. When the optical brightener has become uniformly distributed, the sheet is pulled off the calender and is then pressed in a heated press at 130° to 135°C to give sheets.

A strong brightening effect is thus achieved.

EXAMPLE 6

1.5 g of a delustring agent, 1 g of titanium dioxide (rutile type) and 0.05 g of the compound of the formula (6) are stirred into a polyurethane coating composition of 13.3 g of isocyanate-modified polyester, 26.7 g of ethyl acetate, 2 g of reaction accelerator and 2 g of polyfunctional isocyanate as a crosslinking agent. This mixture is left to stand for 2 hours and is then spread by means of a knife or a film-pulling rod onto a cotton fabric (wet film thickness 1 mm). Thereafter the coating is dried for 24 hours at room temperature. The fabric coated in this way shows a strong optical brightening effect of good fastness to light.

EXAMPLE 7

An intimate mixture of 100 parts of polyvinyl chloride, 3 parts of stabiliser (Advastat BD 100; Ba/Cd complex), 2 parts of titanium dioxide, 59 parts of dioctyl phthalate and 0.01 to 0.2 part of one of the compounds of the formulae (5) or (6) is calendered on a calender at 150° to 155°C to give a sheet. The opaque polyvinyl chloride sheet thus obtained possesses a substantially higher degree of whiteness than a sheet which does not contain the optical brightener.

EXAMPLE 8

A 13 percent strength casting composition of acetylcellulose in acetone which contains — relative to the dry weight of plastic — 2 percent of anatase (titanium dioxide) as a delustring agent and 0.04 percent of one of the compounds of the formulae (3) or (6), is case on a glass plate and drawn into a thin film by means of a metal rod. After drying, the film shows a substantially higher degree of whiteness than a film manufactured in the same way but not cntaining an optical brightener.

EXAMPLE 9

7 g of anatase (TiO$_2$) followed by 350 g of polyacrylo-nitrile polymer (=PAC) in powder form, are added to 1,400 ml of dimethylformamide; the mixture is converted into a viscous mass by means of a high speed stirrer.

5 mg of the compound of the formula (6) are added to 50 g of this 20 percent strength solution of the PAC. This mixture is homogenised by stirring and is then left to stand for 1 hour in order to allow the air bubbles formed to diffuse out.

Thereafter, the mass is cast on a glass plate and drawn out into a uniform film by means of a metal rod. The PAC film is then dried for approx. 15 minutes in a drying cabinet at 50°C with ventilation (air extraction) and then at room temperature with slight ventilation.

The PAC film can then easily be removed from the glass plate. It has a substantially higher degree of whiteness than a film manufactured in the same way but not containing the optical brightener.

I claim:

1. A Pyrenyl-triazine compound of the formula

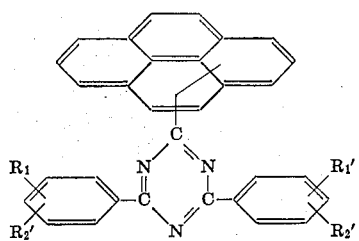
wherein $R_1$, $R_1'$, $R_2$ and $R_2'$ independently of one another are hydrogen, alkyl of 1 to 4 carbon atoms or halogen.
2. A Pyrenyl-triazine compound according to claim 1, corresponding to the formula
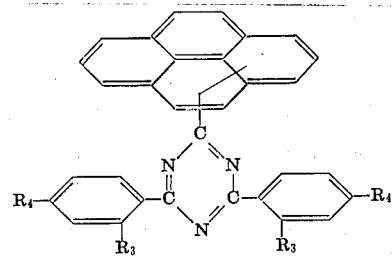
wherein $R_3$ and $R_4$ independently of one another are hydrogen, alkyl with 1 to 4 carbon atoms chlorine or bromine.
* * * * *